(12) United States Patent
Marton et al.

(10) Patent No.: US 7,477,735 B2
(45) Date of Patent: Jan. 13, 2009

(54) SYSTEM AND METHOD FOR ENHANCED STEREO AUDIO

(75) Inventors: Trygve Frederik Marton, Oslo (NO); Ingvar Flaten Aarnes, Oslo (NO); Bjørn Winsvold, Tranby (NO); Geir Ole Øverby, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 624 days.

(21) Appl. No.: 11/022,293

(22) Filed: Dec. 22, 2004

(65) Prior Publication Data

US 2005/0157866 A1 Jul. 21, 2005

(30) Foreign Application Priority Data

Dec. 23, 2003 (NO) .................................. 20035796

(51) Int. Cl.
*H04M 9/08* (2006.01)
(52) U.S. Cl. ................................. 379/406.04
(58) Field of Classification Search ............ 379/406.04, 379/406.08, 406.11, 406.14; 381/71.7
See application file for complete search history.

(56) References Cited

U.S. PATENT DOCUMENTS

| 6,738,480 | B1 * | 5/2004 | Berthault et al. ............... 381/66 |
| 2002/0154041 | A1 * | 10/2002 | Suzuki et al. .................. 341/51 |

FOREIGN PATENT DOCUMENTS

| EP | 1 052 838 A1 | 11/2000 |
| EP | 1 406 397 A1 | 4/2004 |
| WO | WO 9212583 A1 | 7/1992 |
| WO | WO 03/007500 A1 | 1/2003 |

OTHER PUBLICATIONS

Benesty, J., et al., "A Better Understanding and an Improved Solution to the Specific Problems of Stereophonic Acoustic Echo Cancellation," *IEEE Transactions on Speech and Audio Processing*, 6(2):156-165, (1998).

Gansler, T., et al., "New Insights Into the Stereophonic Acoustic Echo Cancellation Problem and an Adaptive Nonlinearity Solution," *IEEE Transactions on Speech and Audio Processing*, 10(5): 257-267, (2002).

Gauger, M., "An Improved Method for Stereo Acoustic Echo Canceling," *IEEE*, pp. 596-599, (2003).

(Continued)

*Primary Examiner*—Alexander Jamal
(74) *Attorney, Agent, or Firm*—Oblon, Spivak, McClelland, Maier & Neustadt, P.C.

(57) ABSTRACT

An audio communication system and method with improved acoustic characteristics features a stereo detector that is introduced in the echo canceller of the system. When stereo in far-end audio is detected, converging of the adaptive mono model of the canceller is suspended, and when stereo in far-end audio is not detected, converging of the adaptive stereo model of the canceller is suspended. The system may also be extended with a miscellaneous processing unit configured to attenuate the signal at certain events implying a large stereo echo contribution. A stereo collapsing unit is also introduced on the channels of the far-end audio to remove the stereo image at certain events to further suppress the echo contribution.

16 Claims, 9 Drawing Sheets

OTHER PUBLICATIONS

Benesty, J., et al., "A Hybrid Mono/Stereo Acoustic Echo Canceler," *IEEE Transactions on Speech and Audio Processing*, 6(5): 468-475, (1998).

Benesty, J., et al., "A Better Understanding and an Improved Solution to the Specific Problems of Stereophonic Acoustic Echo Cancellation," *IEEE Transactions on Speech and Audio Processing*, 6(2): 156-165, (1998).

Gansler, T., et al., "New Insights Into the Stereophonic Acoustic Echo Cancellation Problem and an Adaptive Nonlinearity Solution," *IEEE Transactions on Speech and Audio Processing*, 10 (5): 257-267, (2002).

Gauger, M., "An Improved Method for Stereo Acoustic Echo Canceling," *IEEE*, pp. 596-599, (2003).

Benesty, J., et al., "A Hybrid Mono/Stereo Acoustic Echo Canceler," *IEEE Transactions on Speech and Audio Processing*, 6(5): 468-475, (1998).

* cited by examiner

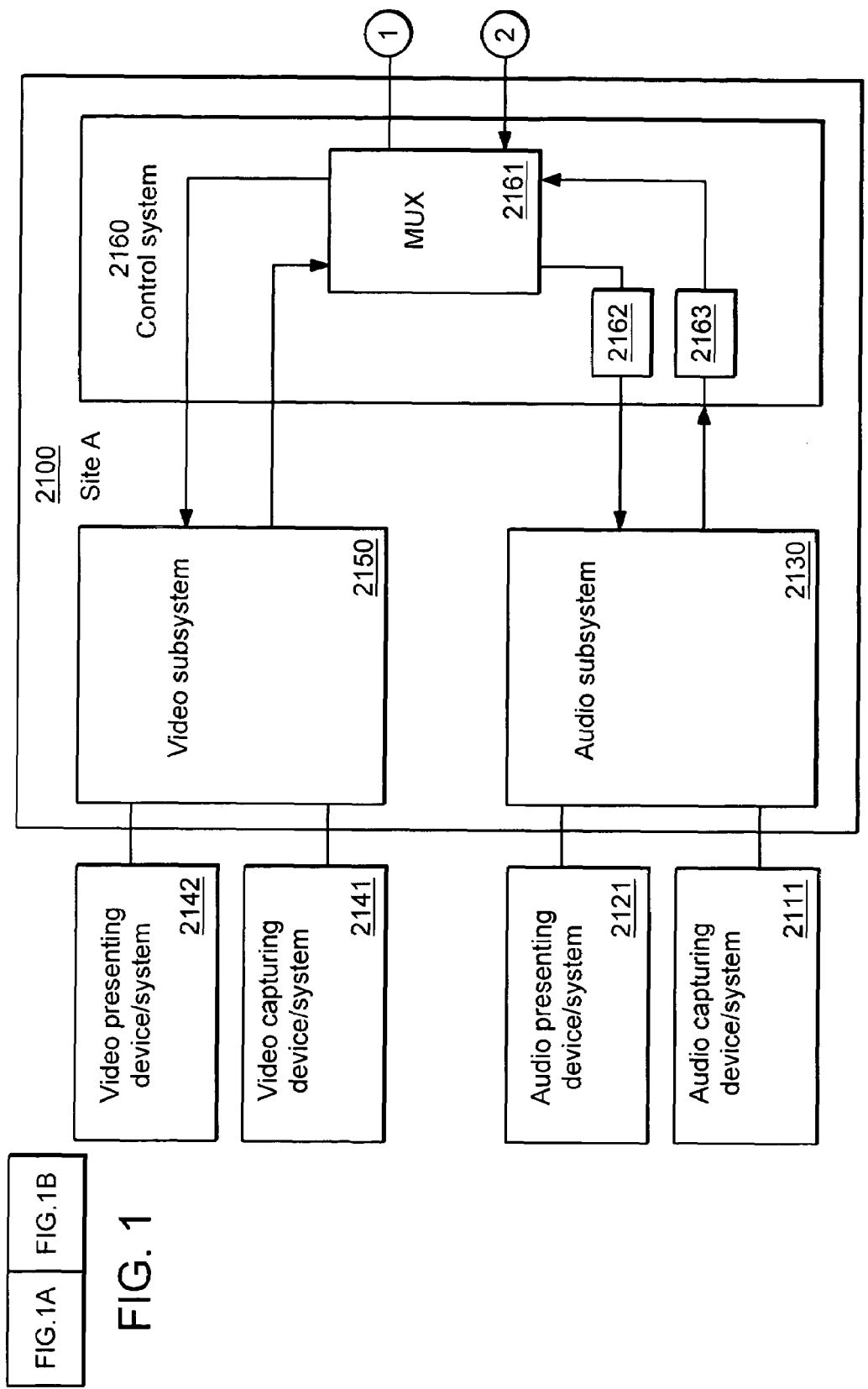

| FIG. 5A | FIG. 5B |

US 7,477,735 B2

SYSTEM AND METHOD FOR ENHANCED STEREO AUDIO

RELATED APPLICATION

This application claims priority under 35 U.S.C. § 119 or 365 to Norwegian Application No. 20035796 filed Dec. 23, 2003. The entire teachings of the above application are incorporated herein by reference.

FIELD OF THE INVENTION

The present invention relates to an audio communication system and method with improved acoustic characteristics, and particularly to a conferencing system including an improved audio echo cancellation system.

BACKGROUND OF THE INVENTION

In a conventional conferencing system set-up that uses loudspeakers, two or more communication units are placed at separate sites. A signal transmitted from one site to another site using a conference system experiences several delays, these delays will include a transmission delay and a processing delay. For a video conferencing system, the processing delay for video signals is considerably larger than the processing delay for the audio signals. Because the video and audio signals have to be presented simultaneously, in phase, a lip sync delay is purposefully introduced to the audio signal, in both the transmitting and receiving signal paths in order to compensate for the longer video signal delay.

In a conventional conferencing system, one or more microphones captures a sound wave at a site A, and transforms the sound wave into a first audio signal. The first audio signal is transmitted to a site B, where a television set or an amplifier and loudspeaker, reproduces the original sound wave by converting the first audio signal generated at site A into the sound wave. The produced sound wave at site B, is captured partially by the audio capturing system at site B, converted to a second audio signal, and transmitted back to the system at site A. This problem of having a sound wave captured at one site, transmitted to another site, and then transmitted back to the initial site is referred to as acoustic echo. In its most severe manifestation, the acoustic echo might cause feedback sound, when the loop gain exceeds unity. The acoustic echo also causes the participants at both site A and site B to hear themselves, making a conversation over the conferencing system difficult, particularly if there are delays in the system set-up, as is common in video conferencing systems, especially due to the above mentioned lip sync delay. The acoustic echo problem is usually solved using an acoustic echo canceller, described below.

FIGS. 1A and 1B are an overall view of a video conferencing system. This system is distributed at two sites, A and B. As for the conferencing system set-up, a video conferencing module can be distributed at more than two sites and the system set-up is functional when only one site has a loudspeaker. The video module has at site A a video capturing system 2141 that captures a video image and a video subsystem 2150 that encodes the video image. In parallel, a sound wave is captured by an audio capturing system 2111 and an audio subsystem 2130 encodes the sound wave to the acoustic signal. Due to processing delays in the video encoding system, the control system 2160 introduces additional delays to the audio signal by use of a lip sync delay 2163 so to achieve synchronization between the video and audio signals. The video and audio signals are mixed together in a multiplexer 2161 and the resulting signal, the audio-video signal is sent over the transmission channel 2300 to site B. Additional lipsync delay 2262 is inserted at site B. Further, the audio signal presented by the audio presenting device 2221 is materialized as a sound wave at site B. Part of the sound wave presented at site B arrives to the audio capturing device 2211 either as a direct sound wave or as a reflected sound wave. Capturing the sound at site B and transmitting this sound back to site A together with the associated delays forms the echo. All delays described sums up to be considerable and therefore the quality requirements for an echo canceller in the video conferencing system are particularly high.

FIG. 2 shows an example of an acoustic echo canceller subsystem, which may be a part of the audio system in the video conferencing system of 1A and 1B. At least one of the participant sites has the acoustic echo canceller subsystem in order to reduce the echo in the communication system. The acoustic echo canceller subsystem 3100 is a full band model of a digital acoustic echo canceller. A full band model processes a complete audio band (e.g., up to 20 kHz; for video conferencing the band is typically up to 7 kHz, in audio conferencing the band is up to 3.4 kHz) of the audio signals directly. The acoustic echo canceller subsystem 3100 is shown coupled to acoustic system 3200 that includes audio capturing system 3210 (microphone 3211) and audio presenting system 3220 (amplifier 3221 and loud speaker 3222). Direct sound wave 3241 and reflected sound wave 3242 in relation to loud speaker 3222 are captured by microphone 3211 along with other sound waves 3251.

As already mentioned, compensation of acoustic echo is normally achieved by an acoustic echo canceller. The acoustic echo canceller is a stand-alone device or an integrated part in the case of the communication system. The acoustic echo canceller transforms the acoustic signal transmitted from site A to site B, for example, using a linear/non-linear mathematical model and then subtracts the mathematically modulated acoustic signal from the acoustic signal transmitted from site B to site A. In more detail, referring for example to the acoustic echo canceller subsystem 3100 at site B, the acoustic echo canceller passes the first acoustic signal 3131 from site A through the mathematical modeller of the acoustic system 3121, calculates an estimate 3133 of the echo signal, subtracts the estimated echo signal from the second audio signal 3132 captured at site B, and transmits back the second audio signal 3135, less the estimated echo to site A. The echo canceller subsystem of FIG. 2 also includes an estimation error 3134, i.e., a difference between the estimated echo and the actual echo, to update or adapt the mathematical model at 3141 to a background noise and changes of the environment, at a position where the sound is captured by the audio capturing device.

The model of the acoustic system 3121 used in most echo cancellers is a FIR (Finite Impulse Response) filter, approximating the transfer function of the direct sound and most of the reflections in the room. A full-band model of the acoustic system 3121 is relatively complex and requires processing power, and alternatives to full-band models are normally preferred.

One way of reducing the processing power requirements of an echo canceller is to introduce sub-band processing, i.e. the signal is divided into bands with smaller bandwidth, which can be represented using a lower sampling frequency. An example of such system is illustrated in FIG. 3. The loudspeaker and microphone signals are divided by the analyze filter into sub bands, each representing a smaller range of frequencies of the original loudspeaker and microphones respectively. Similar echo cancelling and other processing are performed on each sub band, before all bands of the modified microphone are merged together to form the full band signal, by the synthesize filter.

In some cases, it may be convenient to combine sub band and full band processing. Some sub algorithms can be performed both in full band and in sub bands, or a combination.

The core component in an echo canceller is the already mentioned acoustic model (most commonly implemented by a FIR filter). The acoustic model attempts to imitate the transfer function of the far end signal from the loudspeaker to the microphone. This adaptive model is updated by gradient search algorithm. The algorithm tries to minimize an error function, which is the power of the signal after the echo estimate is subtracted. For a mono echo canceller, this solution works, it is a uniform and unique solution.

However, in high quality communications, it is often desirable to transmit and present high quality multi channel audio, e.g. stereo audio. Stereo audio includes audio signals from two separate channels representing different spatial audio from a certain sound composition. Loading the channels on each respective loudspeaker creates a more faithful audio reproduction, as the listeners will perceive a spatial difference between the audio sources from which the sound composition is created.

The signal that is played on one loudspeaker differs from the signal presented on the other loudspeaker(s). Thus, for a stereo (or multi channel) echo canceller, the transfer function from each respective speaker to the microphone needs to be compensated for. This is a somewhat different situation compared to mono audio echo cancellation, as there are two different but correlated signals to compensate for.

In addition, the correlation in the different channels tends to be significant. This causes the normal gradient search algorithms to suffer. Mathematically expressed, the correlation introduces several false minimum solutions to the error function. This is i.a. described in Steven L. Gat and Jacob Benesty "Acoustic signal processing for telecommunication", Boston: Kluwer Academic Publishers, 2000. The fundamental problem is that when multiple channels carry linearly related signals, the solution of the normal function corresponding to the error function solved by the adaptive algorithm is singular. This implies that there is no unique solution to the equation, but an infinite number of solutions, and it can be shown that all but the true one depend on the impulse responses of the transmission room (in this context, the transmission room may also include a synthesized transmission room as e.g. recorded or programmed material played back at the far-end side). The gradient search algorithm may then be trapped in a minimum that is not necessarily the true minimum solution.

Another common way of expressing this stereo echo canceller adaptation problem is that it is difficult to distinguish between a room response change and an audio "movement" in the stereo image. For example, the acoustic model has to reconverge if one talker starts speaking at a different location at the far end side. There is no adaptive algorithm that can track such a change sufficiently fast, and a mono echo canceller in the multi-channel case does not result in satisfactory performance.

A typical approach for overcoming the above-mentioned false minimum solutions problem mentioned above is shown in FIG. 4. Compared to the mono case, the analyze filter is duplicated, dividing both the right and left loudspeaker signal into sub bands. The acoustic model is divided into two models (per sub band), one for the right channel transfer function and one for the left channel transfer function.

To overcome the false minimum solutions introduced by the correlation between the left and right channel signals, a decorrelation algorithm is introduced. This decorrelation makes it possible to correctly update the acoustic models. However, the decorrelation technique also modifies the signals that are presented on the loudspeakers. While quality preserving modification techniques could be acceptable, the decorrelation techniques according to prior art severely distort the audio.

Therefore, these techniques may solve the stereo echo problem, but it does not preserve the necessary quality of the audio.

SUMMARY OF THE INVENTION

It is an object of the present invention to provide a system minimizing audio echo when stereo is present.

In particular, the present invention discloses an audio echo canceller adjusted to provide an echo attenuated output signal from an echo added input signal including near-end audio in addition to far-end audio adding an echo contribution, comprising a module generating a first module output signal, at least configured to implement a first adaptive model of acoustic echo, converging to minimize a mono part of the echo contribution in the first module output signal when providing a mono echo estimate and subtracting the mono echo estimate from the echo added input signal creating the first module output signal, wherein the audio echo canceller further includes one or more multi component audio detectors configured to detect whether multi component audio is present in the far-end audio, and wherein the first adaptive model is configured to suspend converging when said one or more multi component audio detector detects substantially multi component audio in is the far-end audio, and a second adaptive model is configured to suspend converging when said one or more multi component audio detector does not detect substantially multi component audio in the far-end audio, or a miscellaneous processing unit monitoring the far-end and near-end audio configured to attenuate the first or the second module output signal at predefined far-end/near-end audio presence events is activated when said one or more multi component audio detector does not detect substantially multi component audio in the far-end audio.

BRIEF DESCRIPTION OF THE DRAWINGS

In order to make the invention more readily understandable, the discussion that follows will refer to the accompanying drawings, FIGS. 1A and 1B are a detailed block diagram of a conventional conferencing system set-up.

DETAILED DESCRIPTION OF THE INVENTION

In the following, the present invention will be discussed by describing a preferred embodiment, and by referring to the accompanying drawings. However, even if the specific embodiment is described in connection with video conferencing and stereo sound, people skilled in the art will realize other applications and modifications within the scope of the invention as defined in the enclosed independent claim. In particular, the principles of the invention could also be utilized in connection with other types of conferencing, and it is useful for multiple audio channels. In addition, note that even if the techniques discussed in the following mainly are focused on the sub band case, it can also be used for full band. In a full band canceller, the analyzing and synthesizing filters are omitted. The processing inside the dashed line of the figures is performed on the complete full band audio signals.

The present invention is based on the fact that different channels of a stereo audio signal are highly correlated and that stereo sound seldom is present at all times. Normally, only a small part of the signals of the respective channels differs from each other, and in a typical conference situation, long periods of time may pass in which only mono audio is present. The invention also utilizes the fact that it is not necessarily required to provide a full echo cancellation at all times during a conventional conference. E.g. in the time intervals of loudspeaker silence, there will be no echo at all. Further, in connection with sound presentation from CDs/DVDs etc., stereo signals are present, but this is more a one-way communication, reducing the need for full duplex echo cancelling. In addition, a device playing program material (unlike a person) is not confused by occasional residual echo. Also, in the case of program material, much of the time will have mono audio only.

Figure 1B:
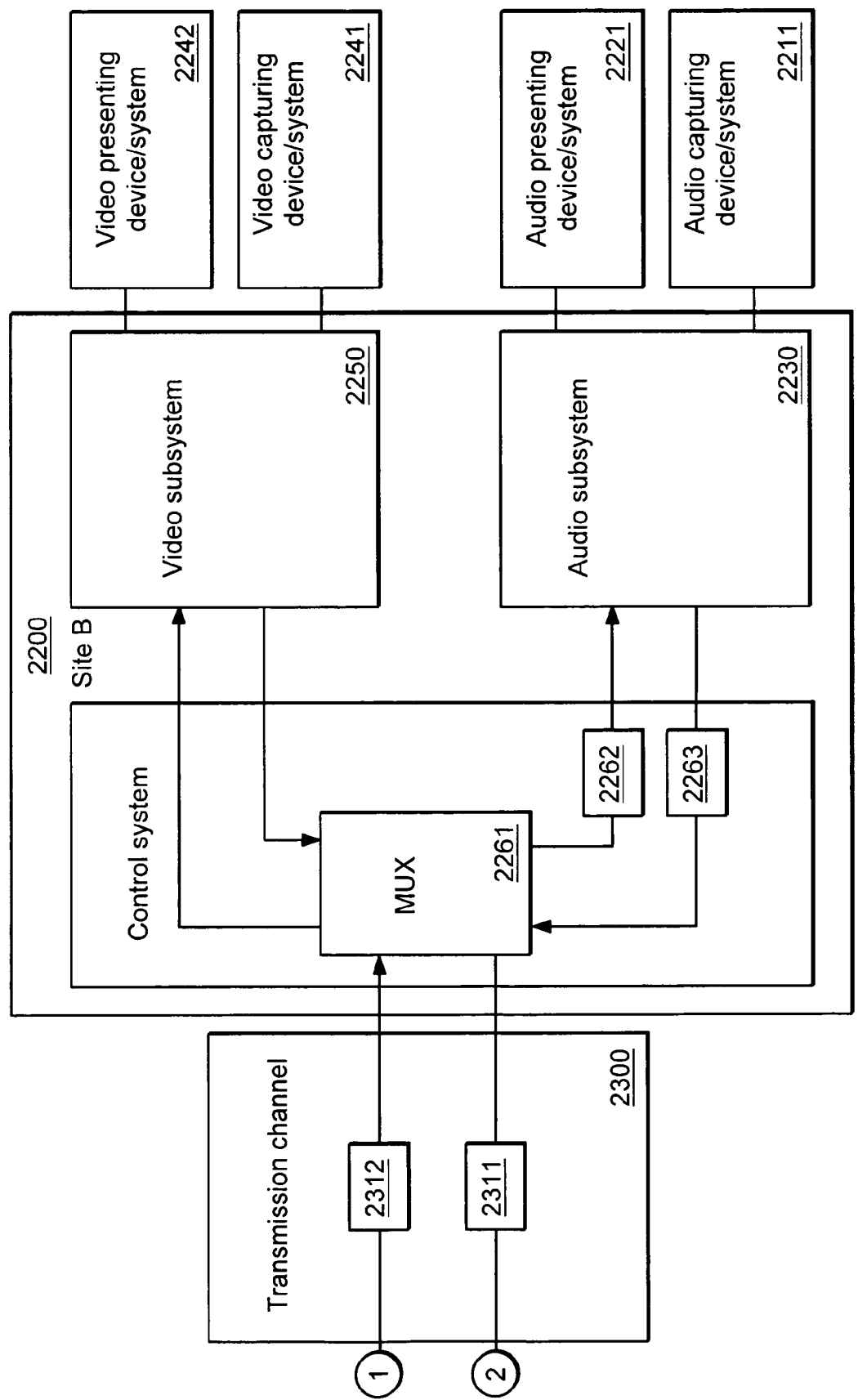
Figure 2:
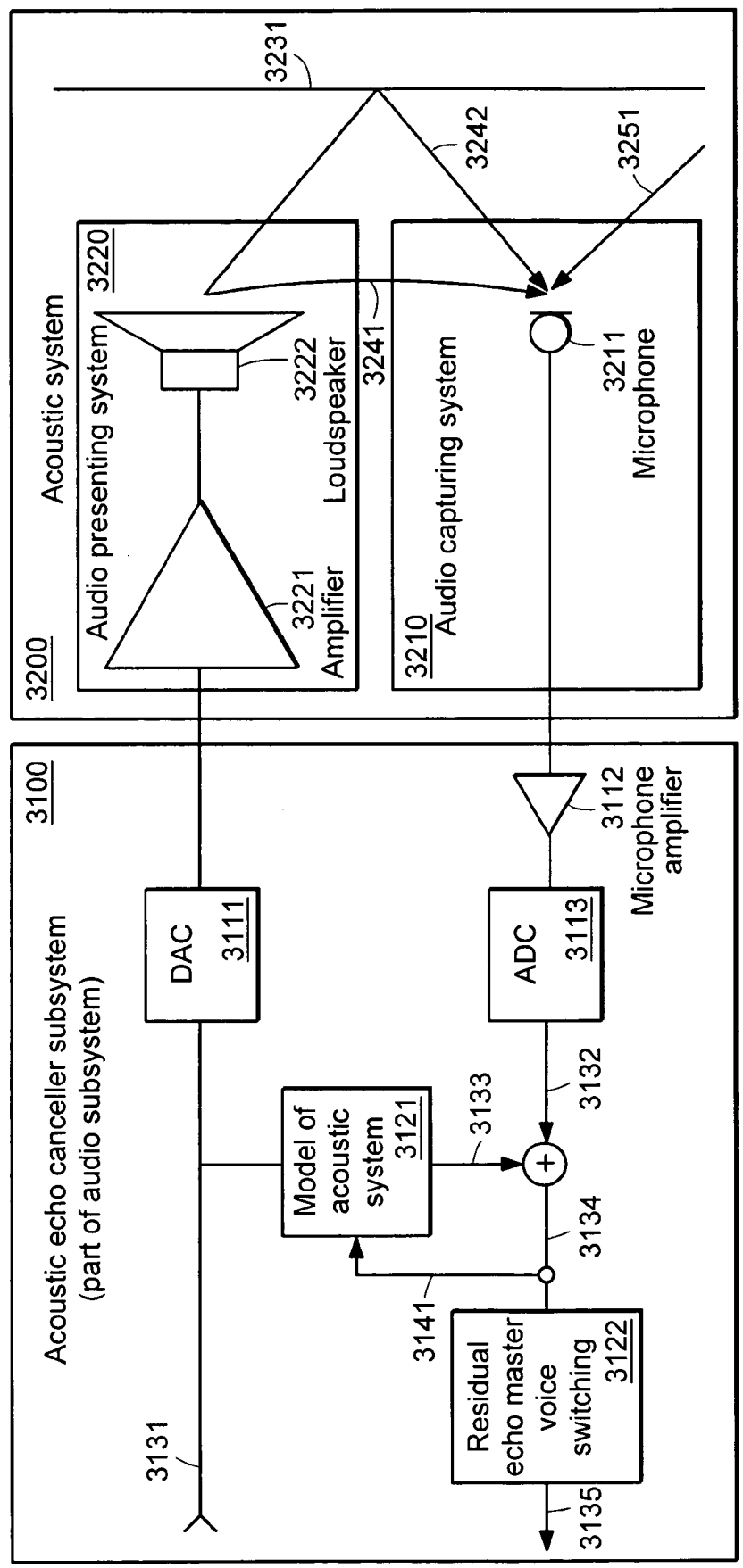
FIG. 2 is a closer view of an acoustic echo canceller subsystem.
Figure 3:
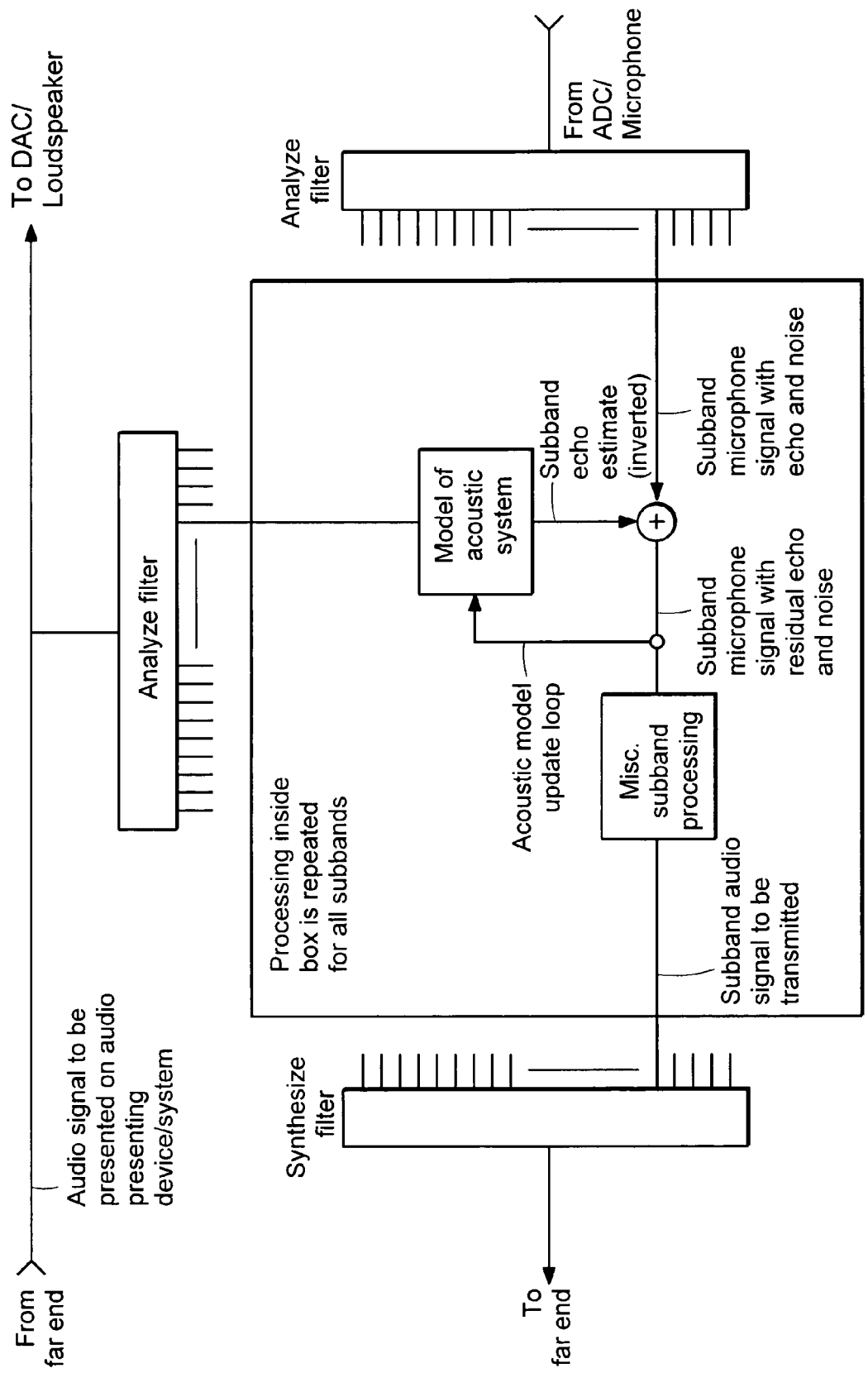
FIG. 3 is a block diagram of the corresponding echo canceller subsystem implemented with sub-band processing.
Figure 4:
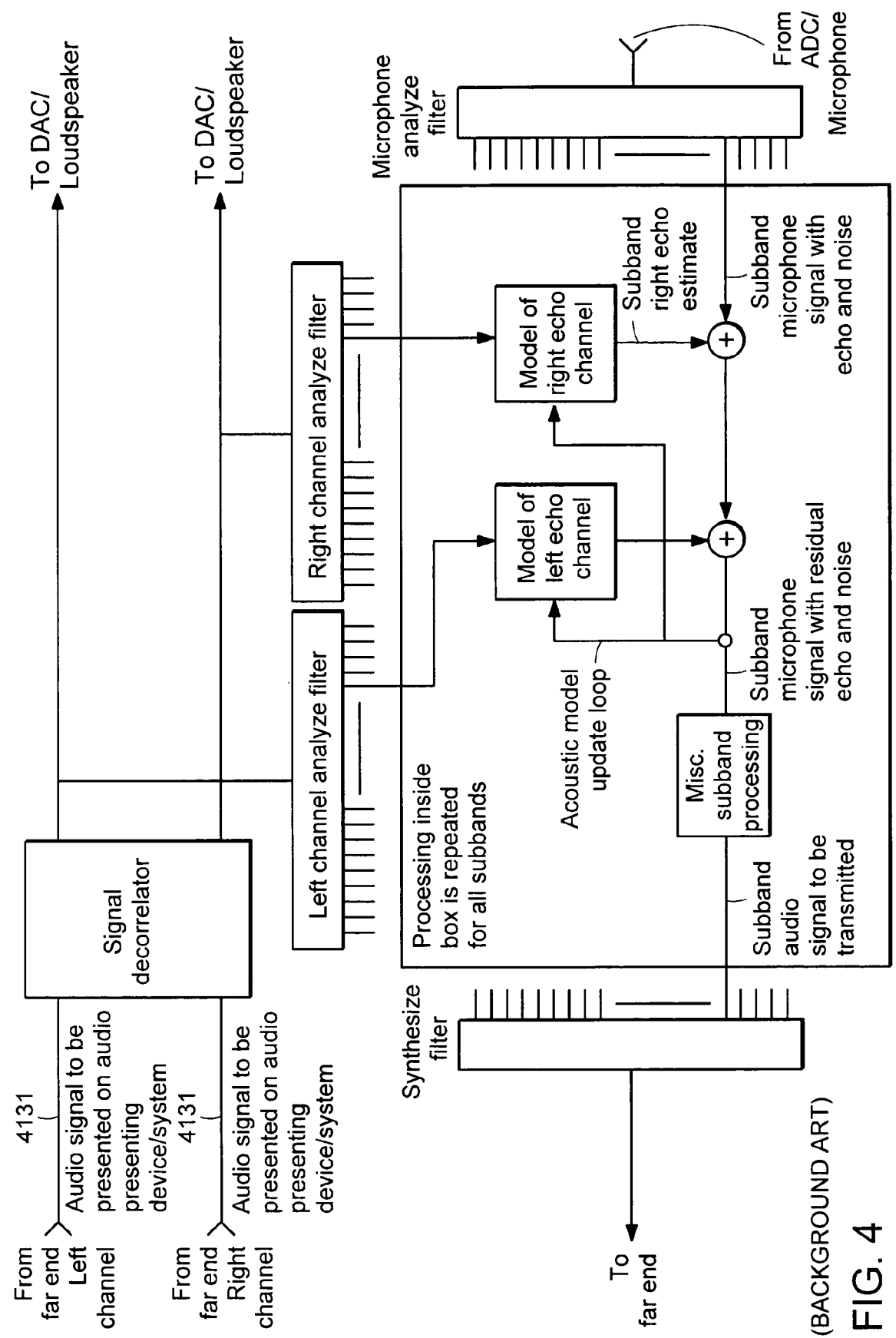
FIG. 4 is a block diagram of a stereo echo cancellator system according to prior art, FIGS. 5A and 5B (hereinafter referred to collectively as FIG. 5) are a block diagram of one embodiment of the present invention.
Figures 5, 5A:
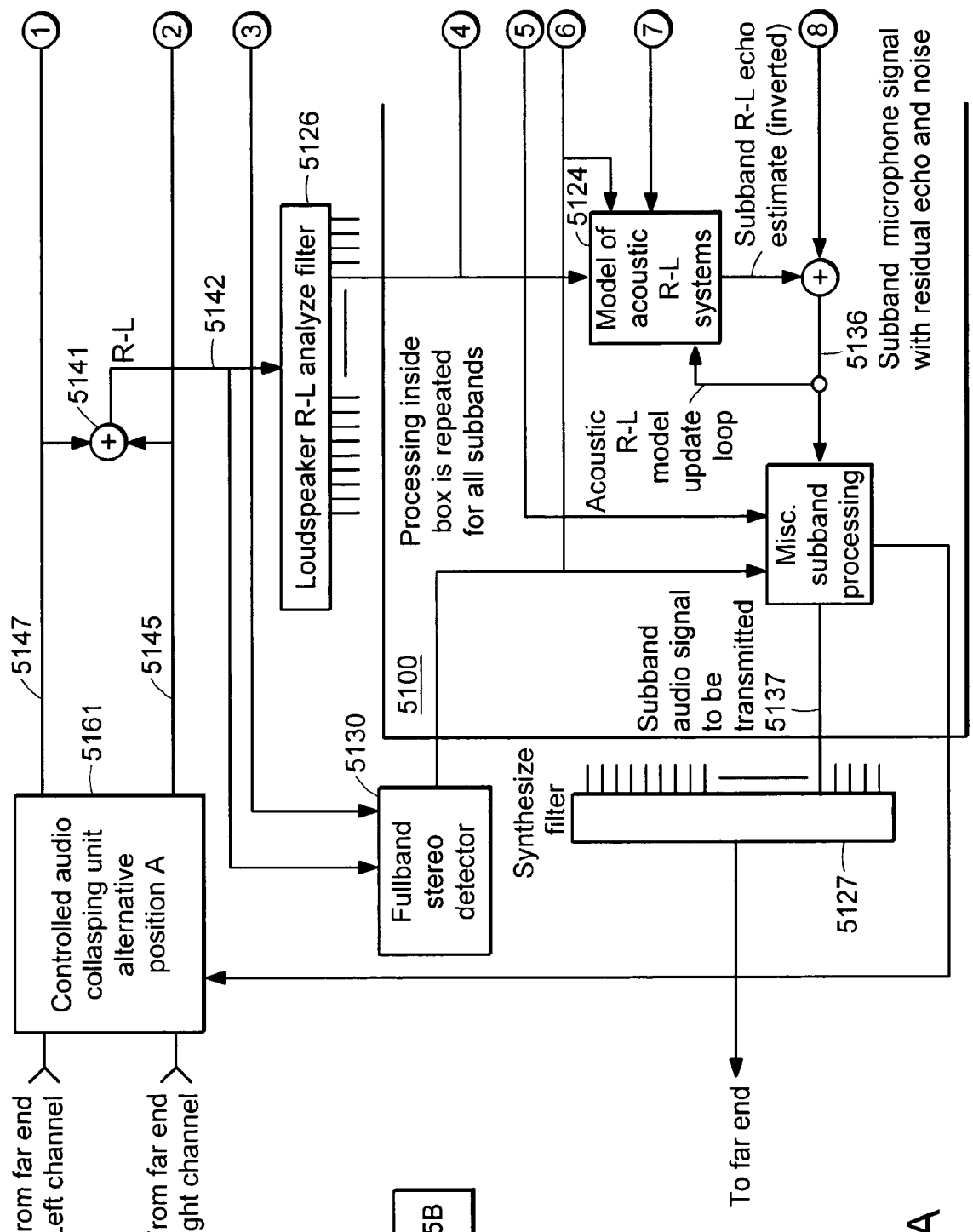
Figure 5B:
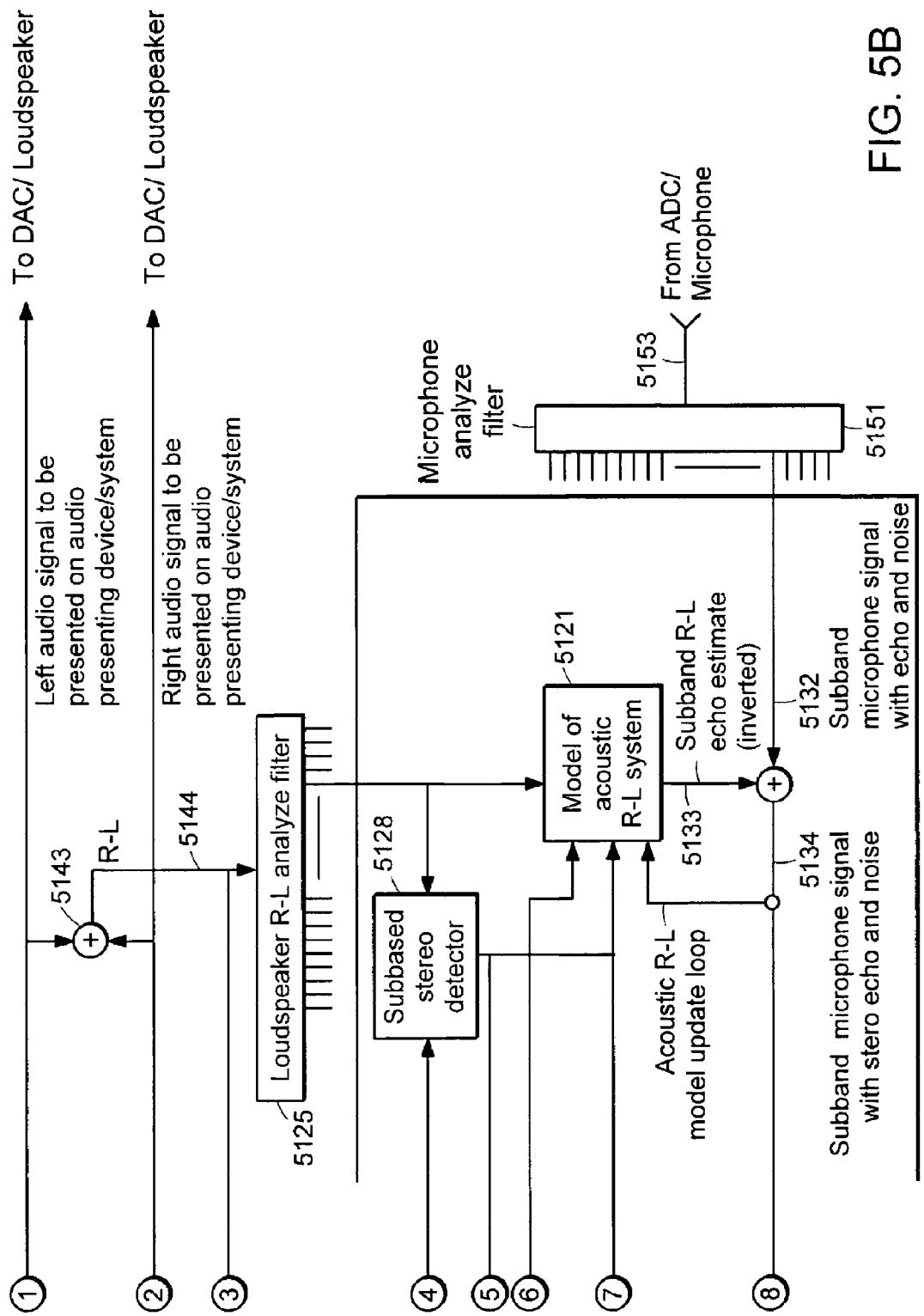

Thus, as the signal in the majority of time is mono, the present invention discloses a hybrid mono/stereo echo canceller structure. An embodiment of the invention is depicted in FIG. 5. Note that many subparts of this figure may be optional; the controlled stereo collapsing unit 5161, the loudspeaker R−L analyze filter 5126 and the full band 5130 or sub band stereo detector 5128 (but not both). Other subparts may be handled somewhat differently, for example by moving the subpart from full band domain to sub band domain or vice versa. These simplifications and changes are further explained in the following description of the various components included in the embodiment of the present invention illustrated in FIG. 5.

According to the invention, the loudspeaker stereo full band signals right (R) 5145 and left (L) 5147 are converted into a full band R+L and a full band R−L representation, by an adding unit 5143 and a subtracting unit 5141, respectively. The full band R+L signal 5144 then represents the mono part of the audio signal, while the full band R−L signal 5142 represents the stereo image. Thus, for situations where only mono signals are to be presented, R−L equals zero.

Both signals are divided into sub band signals; the R+L full band signal is divided into R+L sub band signals using loudspeaker R+L analyze filter 5125, while the R−L full band signal is divided into R−L sub band signals using loudspeaker R−L analyze filter 5126.

An alternative way of calculating the sub band R+L signal and the R−L sub band signal, is to analyze the R and L signals individually, and thereafter perform the addition or subtraction on the sub band signals.

The microphone full band (from ADC/microphone) signal 5153 is divided into a microphone sub band signal by means of the microphone analyze filter 5151.

The echo cancellator according to the present invention is further provided with at least one stereo detector 5128, 5130. As illustrated in FIG. 5, the R+L and R−L signals are fed into such stereo detectors. Detecting of stereo can be performed in either (or both) full band, using the R+L and R−L full band signals and the full band stereo detector 5130, or in sub band, using the R+L and R−L sub band signals and the sub band stereo detector 5128. By using the sub band stereo detector, individual decisions can be made for different frequencies. Therefore, a sub band detector may perform better, however at increased (but not major) computational complexity.

Several techniques can be used to detect stereo, i.e. calculate a stereo detector measure (SDM). One approach is to calculate the ratio of the power of the R−L signal divided by the power of R+L signal:

$$SDM = P_{R-L}/P_{R+L}$$

Stereo can be detected by assuming that SDM is equal to zero for a true mono signal, and greater than zero for a stereo signal.

The power at time i can be calculated over a set of N samples:

$$P_{R+L}(i) = \sum_{n=0}^{N-1} (R_{i-n} + L_{i-n})^2$$

$$P_{R-L}(i) = \sum_{n=0}^{N-1} (R_{i-n} - L_{i-n})^2$$

Alternatively, the power at time i can be calculated using a feedback structure, updating on each new sample. α is a small positive constant, representing the update speed, and will depend on the sampling frequency:

$$P_{R+L}(i) = (1-\alpha)P_{R+L}(i-1) + \alpha(R_i + L_i)^2$$

$$P_{R-L}(i) = (1-\alpha)P_{R-L}(i-1) + \alpha(R_i - L_i)^2$$

An alternative approach for implementing stereo detectors is to calculate the cross correlation (at lag 0) between the R−L signal and the R+L signal, normalized with the power of the R+L signal:

$$SDM = R_{R+L,R-L}/P_{R+L}$$

This SDM also equals 0 for a mono signal, and is increased above zero when stereo components are introduced.

Again, both denominator and numerator can be calculated over a set of samples, or using a feedback structure. The denominator can be calculated as in the first alternative, while the formulas for the numerator will be:

The set of samples case:

$$R_{R+L,R-L}(i) = \sum_{n=0}^{N-1} (R_{i-n} + L_{i-n})(R_{i-n} - L_{i-n})$$

The feedback case:

$$R_{R+L,R-L}(i) = (1-\alpha)R_{R+L,R-L}(i-1) + \alpha(R_i + L_i)(R_i - L_i)$$

Yet another alternative for implementing the stereo detector is to calculate the ratio of the cross correlation between the R and L signal, and the power of the R+L signal:

$$SDM = R_{R,L}/P_{R+L}$$

This SDM is equal to 0.25 for the mono case, and it will decrease with an increasing element of stereo. $R_{R,L}$ can be calculated using a set of samples or a feedback structure using the same formulas as for the latter alternative.

The set of samples case:

$$R_{R,L}(i) = \sum_{n=0}^{N-1} R_{i-n} L_{i-n}$$

The feedback case:

$$R_{R,L}(i) = (1-\alpha) R_{R,L}(i-1) + \alpha R_i L_i$$

These expressions are best suited in the case where R and L signals are presented directly, e.g. in the case where R and L are individually analyzed. In any case, R and L can always be recalculated from R+L and R−L.

One last approach is to calculate the stereo detector measure as the ratio of the cross correlation between the R and L signal, and the power of R plus the power of L:

$$SDM = R_{R,L}/(P_R + P_L)$$

This SDM is equal to 0.5 in the case of mono, and it will decrease as the element of stereo increases. $P_{R,L}$ can be calculated using a set of samples or a feedback structure, using the same expression as for the first stereo detector implementation alternative.

The set of samples case:

$$P_R(i) = \sum_{n=0}^{N-1} R_i^2$$

$$P_L(i) = \sum_{n=0}^{N-1} L_i^2$$

The feedback case:

$$P_R(i) = (1-\alpha) P_R(i-1) + \alpha R_i^2$$

$$P_L(i) = (1-\alpha) P_L(i-1) + \alpha L_i^2$$

These expressions are also best suited in the case where R and L signals are presented directly, e.g. in the case where R and L are individually analyzed.

The stereo detector(s) described above is/are used to control i.a. the mono echo compensator 5121. The compensator comprises an acoustic model used in standard mono echo cancellers, normally implemented with one FIR filter per sub band. However, different from standard mono echo cancellers, the input is the loudspeaker R+L sub band signals. The model is updated using standard adaptation techniques well known from mono echo cancelling for example LMS, NLMS, APA, RLS etc, using the model update loop and gradient search for achieving the minimum of the error function. In this context, there is also a big exception relative to a conventional echo compensator. The adaptation of the acoustic model is frozen whenever the stereo detector detects anything else than a true mono signal, or very close to a true mono signal, assuming that the adaptation has been in progress in a sufficient period of time for being stabilized in an optimal state (for mono echo). Thus, at the time when stereo sound is introduced, the false minimum solutions in the gradient search will not be present, and the filter will not be "trapped" in one of these.

So far, the stereo detector(s) prevents the mono echo compensator to be trapped in a false minimum solution introduced in the error function when stereo is present, and the mono part of the echo signal can still be cancelled. However, the stereo image of the echo signal is still present. This could be removed/attenuated in different ways. One alternative, as illustrated in FIG. 5 is to supplement the mono echo compensator with a stereo echo compensator 5129.

The input of the stereo echo compensator 5129 is the loudspeaker R−L sub band signals, moreover the compensator comprises the same model as for the mono echo compensator 5121. The model is updated using the standard adaptation techniques. However, this adaptation is only enabled when a strong stereo signal is detected by the stereo detector(s). As the mono parts of the signal already are removed with the R+L compensator, only minor mono signal will be present in the feedback signal, then enabling the R−L compensator to converge.

Based on the assumption that signals are mono most of the time, and that the echo canceller performance in stereo situations are not critical, the stereo image compensator may be omitted. This reduces heavily the computational complexity of the overall system, as the R−L model does not need to be calculated or updated. If the system is based on a full band stereo detector only, the loudspeaker R−L analyze filter and the sub band stereo detectors can also be omitted, saving further computational complexity.

As a substitute or supplement to the stereo image echo compensator, some adjustments are made to the misc. subband processing unit 5122 compared to the conventional mono echo canceller. This block removes the residual echo from the microphone signal by introducing attenuation, and it is often referred to as Non Linear Processing (NLP). The direction of the speech is decided (near-end speech, far-end speech or both), from the loudspeaker signals and the microphone signal.

There are three main situations that this non linear processor preferably should handle:
1. Single talk, microphone (near end) signal active, no loudspeaker (far end) signal, or no signals at all: The NLP passes the signal unchanged.
2. Single talk, loudspeaker signal active, no near end talk. The NLP attenuates the signal heavily, to remove residual echo.
3. Double talk, loudspeaker active and near end talk active: The NLP passes the signal unchanged, or attenuates it marginally, as the residual echo is masked by the microphone/near end signal.

The nonlinear processor often work on sub-bands, therefore the NLP can select one of the above three action for one sub-band, and another for other sub-bands.

In mono echo cancellers, the NLP removes the residual echo. However, in stereo situations, if the stereo image compensator is omitted or is not sufficient, the NLP also has to remove the stereo echo. This does not alter the behaviour in the first and second situation, but the third situation should preferably be treated differently, introducing two sub-situations:

3a. Double talk, both microphones and loudspeaker active, no stereo signal detected: The NLP passes the signal unchanged, or attenuates it marginally, as the residual echo is masked by the microphone/near end signal, and since there are no stereo echo signal.
3b. Double talk, both microphones and loudspeaker active, stereo signal detected: The residual echo (low level signal) is masked by the microphone (near end) signal. The stereo echo signal (or the residual stereo echo signal if the stereo echo compensator is present and work properly) has to be removed or accepted (if only residual echo is present accepting is the preferred choice), and upon this choice, which is a predefined choice, the signal is either passed unchanged, i.e. stereo echo is accepted, or attenuated, i.e. so-called voice switching is accepted. Based on the stereo level, a situation between full passing of the signal and full attenuation can be selected, accepting lower levels of stereo echo and moderate voice switching.

The situation described in 3b above, introduces one of two disadvantages—either presence of stereo echo or voice switching or a limited/moderate combination of both. Stereo echo is experienced as boosted echo, and voice switching as half duplex communication (tuning down counter part sound when speaking).

In an alternative embodiment of the present invention, a stereo collapsing unit 5161 is introduced to compensate for these disadvantages. The purpose of stereo collapsing unit 5161 is to bring the situation from stereo to mono, whenever double talk is detected, alternatively, when near end signal is detected.

Another function of the stereo collapsing unit 5161 could be to collapse the stereo image until the mono compensator reaches the first state of convergence, allowing it to adapt even when signals of high level of stereo are presented. Further, it will collapse the stereo image after a large change in room response has occurred until the mono compensator has reconverged.

Figure 6:
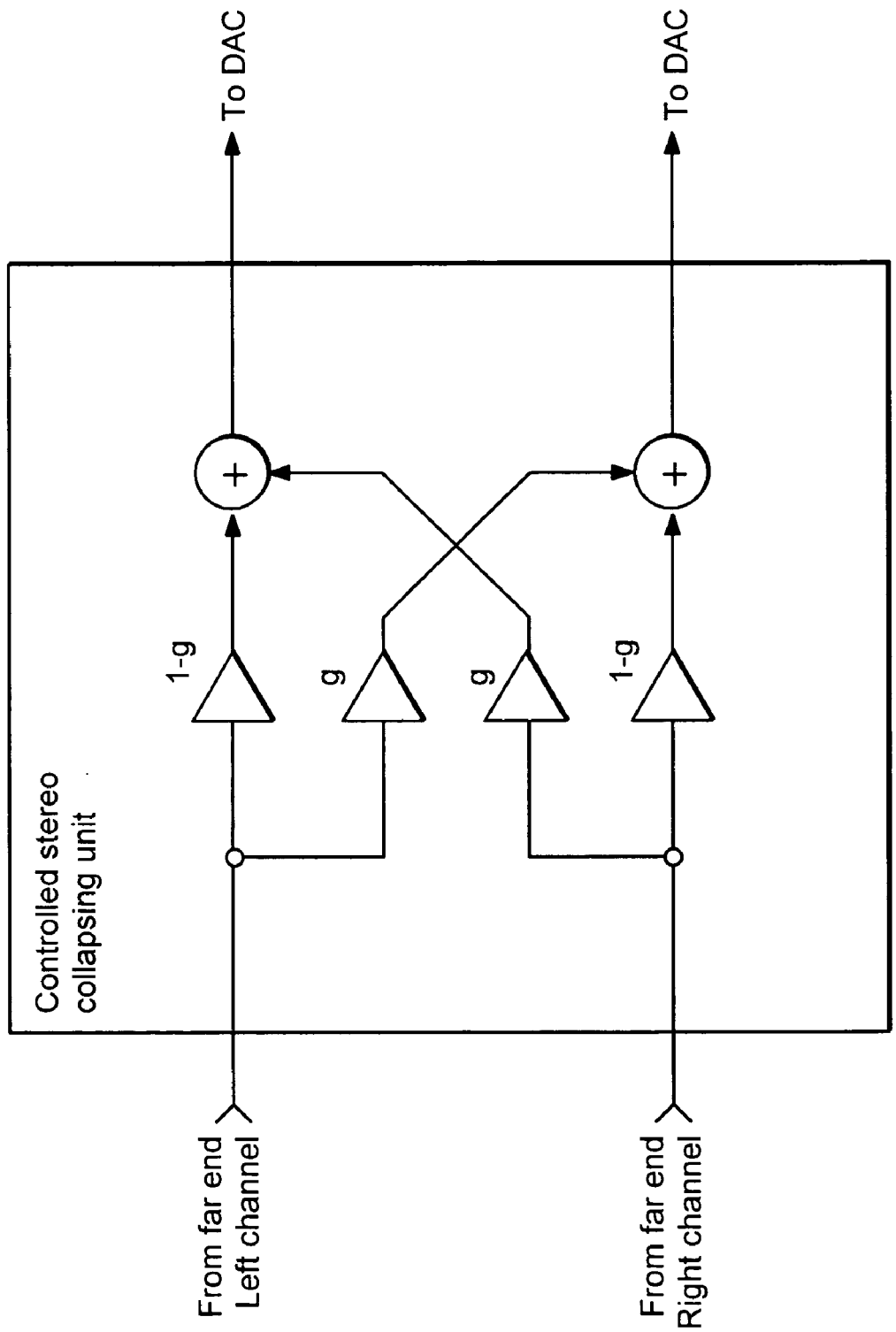
FIG. 6 is a closer view of a frequency independent controlled stereo collapsing unit.

FIG. 6 shows in more detail an embodiment of the stereo collapsing unit. In normal situation, during situation 1 and 2 above, the collapsing gain g is zero and does not alter the left or right signal. Whenever situation 3a or 3b is detected, the gain is increased gradually up to 0.5 eliminating or collapsing the stereo image. In situation 3a, as the signal is mono, this has no effect. However, in situation 3b, collapsing brings the system to situation 3a, where no stereo echo is present, and only residual echo has to be handled by the nonlinear processor unit. When the collapsing is no longer needed, when situations 1 or 2 are detected, alternatively, when no near end speech is present, the collapsing gain is gradually decreased down to 0, to be ready for new situations with stereo signal. The stereo collapsing unit in full effect (g=0.5) simply adds the respective signals of the left and the right channels, and forwards the result to both channels.

Of course, this collapsing unit reduces the stereo image in double talk situations, but in these situations, multiple audio sources are presented, at least partly masking the loss of stereo.

Figure 7:
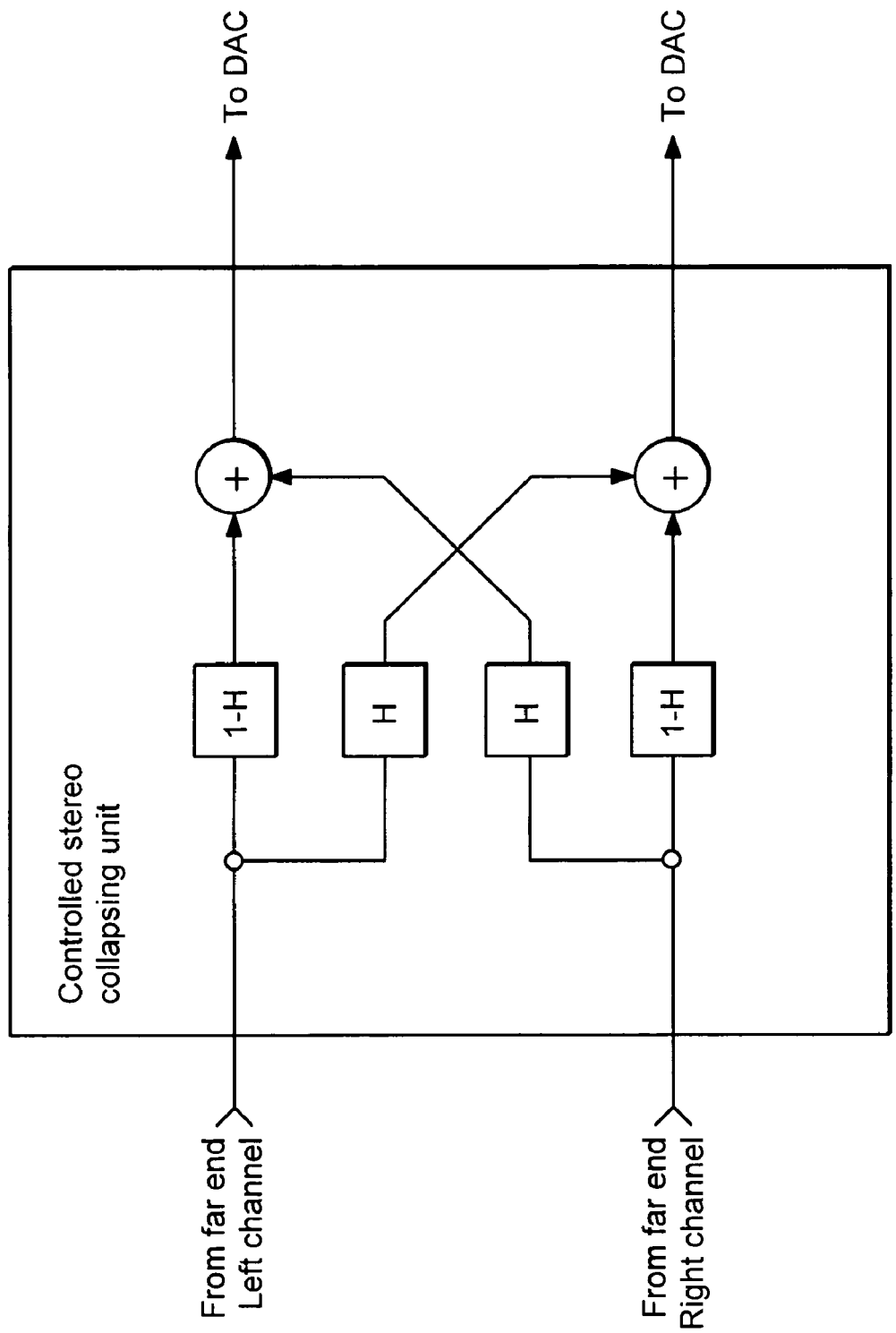
FIG. 7 is a closer view of a general frequency dependent version of the controlled collapsing unit.

FIG. 7 shows an embodiment of a generalized stereo collapsing unit. The collapsing gain g is replaced with the stereo collapsing filter H. This generalized units allows different collapsing in different frequency bands, if different states are detected in different sub bands.

FIG. 7 also allows more static collapsing techniques, i.e. to always collapse frequency bands that are not critical to the subjective perception of the stereo image, while the critical bands are collapsed dynamically.

Those skilled in the art should readily appreciate that the present conferencing approach described herein is deliverable to a computer in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software entity executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While this invention has been particularly shown and described with references to preferred embodiments thereof, it will be understood by those skilled in the art that various changes in form and details may be made therein without departing from the scope of the invention encompassed by the appended claims.

What is claimed is:

1. An audio echo canceller adjusted to provide an echo attenuated output signal from an echo added input signal including near-end audio in addition to far-end audio adding an echo contribution, comprising:
   a mono echo compensator configured to generate a mono echo estimate by implementing a first adaptive model of acoustic echo, converging to minimize a mono part of the echo contribution in the echo added input signal;
   a first subtracting unit configured to subtract the mono echo estimate from the echo added input signal to generate a first output signal;
   one or more multi component audio detectors configured to detect whether multi component audio is present in the far-end audio;
   a stereo echo compensator configured to generate a stereo echo estimate by implementing a second adaptive model of acoustic echo; and
   a second subtracting unit configured to subtract the stereo echo estimate from the first output signal to generate a second output signal,
   wherein the mono echo compensator is configured to suspend converging to minimize the mono part of the echo contribution in the first adaptive model when said one or more multi component audio detectors detects multi component audio in the far-end audio, and
   the stereo echo compensator is configured to suspend converging in the second adaptive model when said one or more multi component audio detectors does not detect multi component audio in the far-end audio.

2. The audio echo canceller according to claim 1, wherein the one or more multi component detectors are one or more stereo detectors having as inputs one left (L) and one right (R) audio channel transmitting the far-end audio, and the one or more stereo detectors are configured to detect stereo in the far-end audio.

3. The audio echo canceller according to claim 2, wherein the one or more stereo detectors are configured to detect stereo when a power ratio between R−L and R+L is greater than zero.

4. The audio echo canceller according to claim 2, wherein the one or more stereo detectors are configured to detect stereo when a cross correlation between R−L and R+L normalized with a power of R+L is greater than zero.

5. The audio echo canceller according to claim 2, wherein the one or more stereo detectors are configured to detect stereo when a cross correlation between R−L and R+L normalized with a power of R+L is less than 0.25.

6. The audio echo canceller according to claim 2, wherein the one or more stereo detectors are configured to detect stereo when a cross correlation between R and L normalized with the power of R plus the power of L is less than 0.5.

7. The audio echo canceller according to claim 2, wherein the second adaptive model is configured to converge to minimize a stereo part of the echo contribution in the module output signal.

8. The audio echo canceller according to claim 7, wherein the first adaptive model derives the mono echo estimate based on a sum of R and L, and the second adaptive model derives the stereo echo estimate from a difference between R and L.

9. The audio echo canceller according to claim 2, further comprising:
a first analyze filter configured to frequency divide at least a part of the echo added input signal into a plurality of echo added input sub-signals each processed with the mono echo estimate and the stereo echo estimate,
a second analyze filter configured to frequency divide at least a part of the sum of L and R into a plurality of sub-sums of L and R and to output said plurality of sub-sums of L and R to said mono echo compensator.

10. The audio echo canceller according to claim 9, further comprising:
a third analyze filter configured to frequency divide at least a part of the difference of L and R into a plurality of sub-differences of L and R and to output said plurality of sub-differences of L and R to said stereo echo compensator and to one of said one or more stereo detectors.

11. The audio echo canceller according to claim 2, further comprising:
a stereo collapsing unit configured to eliminate stereo from the far-end audio when both far-end audio and near-end audio are present.

12. A method for providing an echo attenuated output signal from an echo added input signal including near-end audio in addition to far-end audio adding an echo contribution, comprising:
generating a mono echo estimate by implementing a first adaptive model of acoustic echo, converging to minimize a mono part of the echo contribution in the echo added input signal;
subtracting the mono echo estimate from the echo added input signal to generate a first output signal;
generating a stereo echo estimate by implementing a second adaptive model of acoustic echo;
subtracting the stereo echo estimate from the first output signal to generate a second output signal;
suspending converging to minimize the mono part of the echo contribution in the first adaptive model when detecting multi component audio in the far-end audio; and
suspending converging in the second adaptive model when not detecting multi component audio in the far end audio.

13. The method according to claim 12, further comprising:
transmitting the far end audio by one left (L) and one right (R) audio channel, and said multi component audio is stereo.

14. The method according to claim 13, wherein the generating the stereo echo estimate includes converging the second adaptive model to minimize a stereo part of the echo contribution in the first output signal.

15. The method according to claim 14, further comprising:
the mono echo estimate based on a sum of R and L; and
generating the stereo echo estimate from a difference between R and L.

16. The method according to claim 13, further comprising:
eliminating stereo from the far-end audio when both far-end audio and near-end audio are present.

\* \* \* \* \*